(12) United States Patent
Shiau et al.

(10) Patent No.: US 8,228,448 B2
(45) Date of Patent: Jul. 24, 2012

(54) BACKLIGHT MODULE AND STEREO DISPLAY APPARATUS

(75) Inventors: Tzeng-Ke Shiau, Hsin-Chu (TW); Ching-Shiang Li, Hsin-Chu (TW); Wei-Chung Chao, Hsin-Chu (TW); Chao-Hung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 33 days.

(21) Appl. No.: 12/886,539

(22) Filed: Sep. 20, 2010

(65) Prior Publication Data
US 2011/0221996 A1 Sep. 15, 2011

(30) Foreign Application Priority Data
Mar. 10, 2010 (TW) .................. 99106964 A

(51) Int. Cl.
*G02F 1/1335* (2006.01)
(52) U.S. Cl. ............... 349/15; 349/1; 349/9; 349/61; 349/62; 349/63
(58) Field of Classification Search ............ 349/1, 9, 349/15, 61, 62, 63
See application file for complete search history.

(56) References Cited

U.S. PATENT DOCUMENTS

| 7,303,323 B2 | 12/2007 | Choi et al. |
| 7,529,048 B2 | 5/2009 | Lin |
| 2006/0209428 A1 | 9/2006 | Dobbs et al. |
| 2011/0228387 A1* | 9/2011 | Shiau et al. .......... 359/463 |

FOREIGN PATENT DOCUMENTS

| TW | 475334 | 2/2002 |
| TW | M294667 | 7/2006 |

* cited by examiner

*Primary Examiner* — Jennifer Doan
(74) *Attorney, Agent, or Firm* — Jianq Chyun IP Office

(57) ABSTRACT

A backlight module including a beam splitting film, a light guide plate, and two light emitting elements is provided. The beam splitting film includes a light transmissive plate and multiple strip-shaped protrusion structures. Each of the strip-shaped protrusion structures has a first inclined surface group and a second inclined surface group. The first inclined surface group includes a first inclined surface and a second inclined surface with different slopes. The second inclined surface group includes a third inclined surface and a fourth inclined surface with different slopes. The light guide plate is disposed beside the beam splitting film. The two light emitting elements are respectively disposed at two opposite sides of the light guide plate and capable of flickering alternately. A stereo display apparatus is also provided.

20 Claims, 5 Drawing Sheets

BACKLIGHT MODULE AND STEREO DISPLAY APPARATUS

CROSS-REFERENCE TO RELATED APPLICATION

This application claims the priority benefit of Taiwan application serial no. 99106964, filed Mar. 10, 2010. The entirety of the above-mentioned patent application is hereby incorporated by reference herein and made a part of this specification.

BACKGROUND OF THE INVENTION

1. Field of the Invention

The invention relates to a light source module and a display. More particularly, the invention relates to a backlight module and a stereo display apparatus.

2. Description of Related Art

With development of display technology, displays having better image quality, richer color performance, and better performance effect are continuously developed. In recent years, a stereo display technology has extended to home display applications from cinema applications. Since a key technique of the stereo display technology is to ensure a left eye and a right eye of a user to respectively view left-eye images and right-eye images of different viewing angles, according to the conventional stereo display technology, the user generally wears a special pair of glasses to filter the left-eye images and the right-eye images.

However, to wear the special pair of glasses may generally cause a lot of inconveniences, especially for a nearsighted or farsighted user who has to wear a pair of glasses with corrected vision, the extra pair of special glasses may cause discomfort and inconvenience. Therefore, a naked-eye stereo display technology becomes one of the key focuses in researches and developments. However, according to the current naked-eye stereo display technology, only one vision zone may be generated, and such vision zone is generally located at a center of a display. When the user leaves the vision zone, the user may not view the stereo image. Therefore, according to such stereo display technology, multiple users may not simultaneously view the stereo images.

Taiwan Patent No. 475334 discloses a dichroic layer, wherein an upper surface of the dichroic layer has a two-dimensional micro lens array, and a lower surface of the dichroic layer has a grating structure. Moreover, U.S. Pat. No. 7,303,323 discloses a prism, wherein a lower surface of the prism has a prism structure, and a hypotenuse of the prism is an arc-shaped. Besides, Taiwan Patent No. M294667 and U.S. Pat. No. 7,529,048 disclose an optical film having a base film and prisms, wherein hypotenuse slopes of an upper prism and a lower prism are different, and the hypotenuse slope of the lower prism is less than the hypotenuse slope of the upper prism. U.S. Patent application publication No. 20060209428 discloses an optical film structure having micro lenses and prisms, wherein the micro lenses are one-by-one corresponding to the prisms.

SUMMARY OF THE INVENTION

Accordingly, the invention is directed to a backlight module, and the backlight module may form light beams capable of being viewed by a left eye and a right eye of a user and may simultaneously form a plurality of vision zones.

The invention is directed to a stereo display apparatus, and the stereo display apparatus may form a plurality of vision zones.

Additional aspects and advantages of the invention will be set forth in the description of the techniques disclosed in the invention.

To achieve one of or all aforementioned and other objects, an embodiment of the invention provides a backlight module including a beam splitting film, a light guide plate, and two light emitting elements. The beam splitting film includes a light transmissive substrate and a plurality of strip-shaped protrusion structures. The light transmissive substrate has a first surface and a second surface opposite to the first surface, wherein the first surface is a light emitting surface. The strip-shaped protrusion structures are disposed on the second surface. Each of the strip-shaped protrusion structures has a first inclined surface group and a second inclined surface group. The first inclined surface group and the second inclined surface group are inclined to the first surface, and an inclining direction of the first inclined surface group relative to the first surface is opposite to an inclining direction of the second inclined surface group relative to the first surface. The first inclined surface group includes a first inclined surface and a second inclined surface, and a slope of the first inclined surface relative to the first surface is different to a slope of the second inclined surface relative to the first surface. The second inclined surface group includes a third inclined surface and a fourth inclined surface, and a slope of the third inclined surface relative to the first surface is different to a slope of the fourth inclined surface relative to the first surface. The light guide plate is disposed at a side of the beam splitting film. The light guide plate has a third surface, a fourth surface opposite to the third surface, and two light incident surfaces connecting the third surface and the fourth surface. The two light incident surfaces are respectively located at two opposite sides of the light guide plate, the third surface is located between the second surface and the fourth surface, and the second surface is located between the first surface and the third surface. The two light emitting elements are respectively disposed beside the two light incident surfaces, and are capable of respectively emitting two light beams. The two light beams are capable of respectively entering the light guide plate through the two light incident surfaces, and are transmitted to the beam splitting film through the third surface. Moreover, the two light emitting elements are capable of alternately flickering.

Another embodiment of the invention provides a stereo display apparatus including the aforementioned backlight module and a liquid crystal display (LCD) panel. The LCD panel is disposed at a side of the backlight module, and the first surface of the light transmissive substrate is located between the LCD panel and the second surface of the light transmissive substrate.

According to the above descriptions, the embodiments of the invention may have at least one of the following advantages or effects. In the beam splitting film, the backlight module, and the stereo display apparatus according to embodiments of the invention, since in each of the strip-shaped protrusion structures, the slope of the first inclined surface of the first inclined surface group is different to the slope of the second inclined surface, and the slope of the third inclined surface of the second inclined surface group is different to the slope of the fourth inclined surface, the light beam may be reflected into different directions, so as to form a plurality of vision zones. In this way, multiple users may simultaneously view and share stereo images from different viewing angles.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
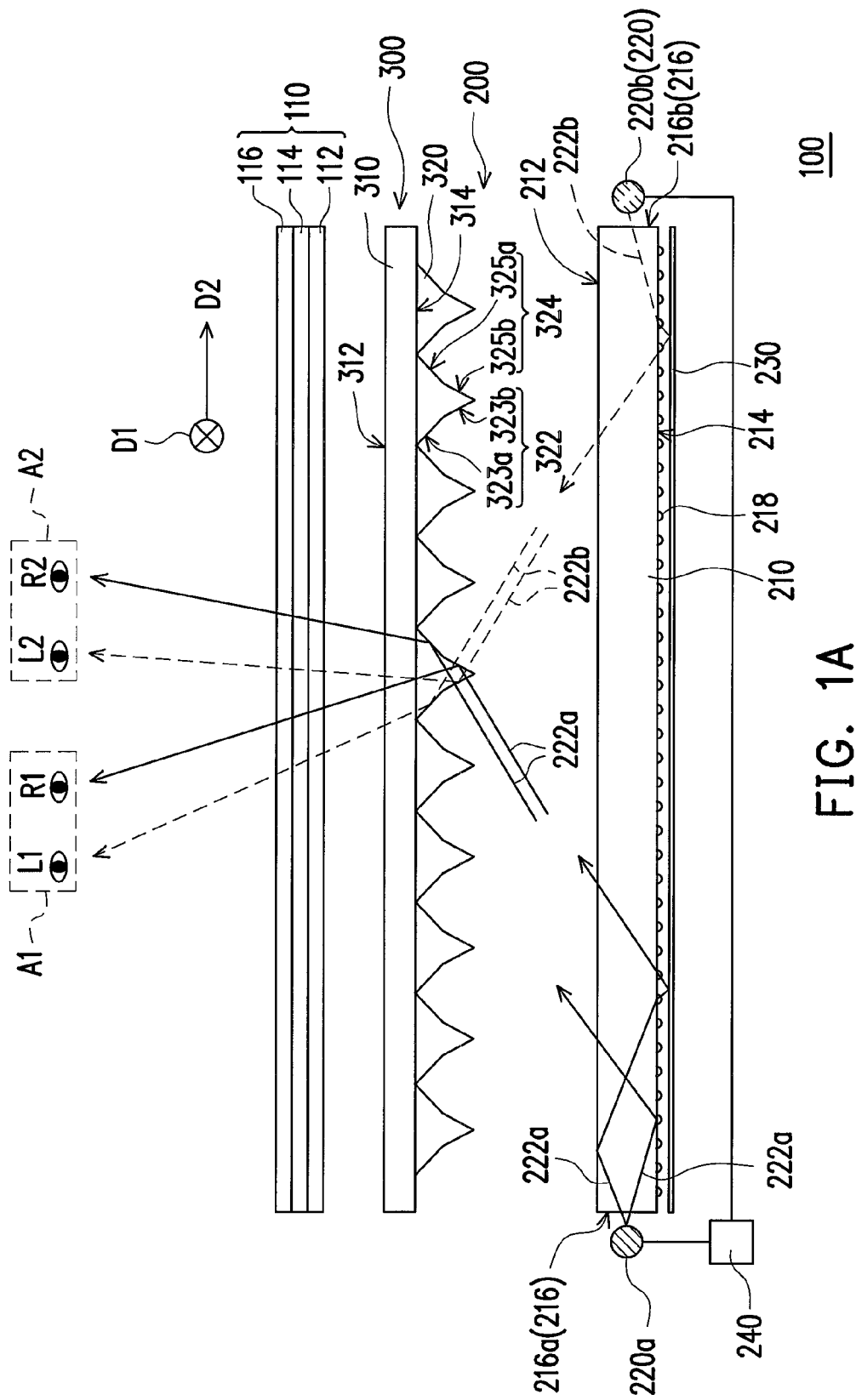
FIG. 1A is a cross-sectional view of a stereo display apparatus according to an embodiment of the invention.
Figure 1B:
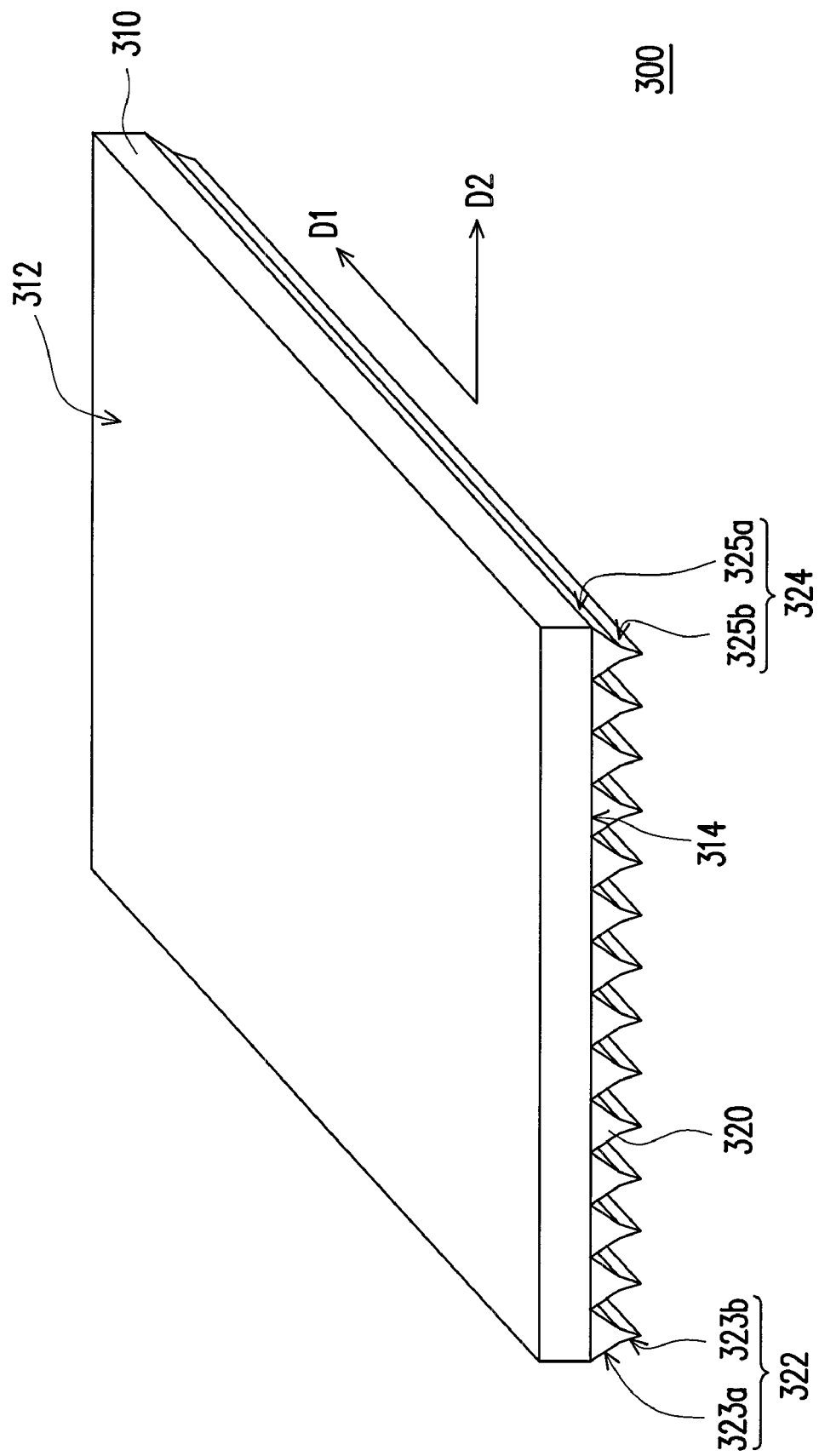
FIG. 1B is a three-dimensional view of a beam splitting film of FIG. 1A.

Referring to FIG. 1A and FIG. 1B, the stereo display apparatus 100 of the present embodiment includes a backlight module 200 and a liquid crystal display (LCD) panel 110. The backlight module 200 includes a beam splitting film 300, a light guide plate 210, and two light emitting elements 220 (in FIG. 1A, light emitting elements 220a and 220b are taken as an example). The beam splitting film 300 includes a light transmissive substrate 310 and a plurality of strip-shaped protrusion structures 320. The light transmissive substrate 310 has a first surface 312 and a second surface 314 opposite to the first surface 312, wherein the first surface 312 is a light emitting surface. The strip-shaped protrusion structures 320 are disposed on the second surface 314. Each of the strip-shaped protrusion structures 320 has a first inclined surface group 322 and a second inclined surface group 324. The first inclined surface group 322 and the second inclined surface group 324 are inclined to the first surface 312, and an inclining direction of the first inclined surface group 322 relative to the first surface 312 is opposite to an inclining direction of the second inclined surface group 324 relative to the first surface 312. For example, in the present embodiment, the first inclined surface group 322 is inclined in a direction from top left to bottom right in the figure of FIG. 1A, and the second inclined surface group 324 is inclined in a direction from top right to bottom left in the figure of FIG. 1A, so that the inclining directions of the first inclined surface group 322 and the second inclined surface group 324 are opposite. In the present embodiment, a slope for inclining from the top left to the bottom right may be defined as negative, a slope for inclining from the top right to the bottom left may be defined as positive, and a slope of the first surface 312 is defined as zero. The first inclined surface group 322 includes a first inclined surface 323a and a second inclined surface 323b, and a slope of the first inclined surface 323a relative to the first surface 312 is different to a slope of the second inclined surface 323b relative to the first surface 312. The second inclined surface group 324 includes a third inclined surface 325a and a fourth inclined surface 325b, and a slope of the third inclined surface 325a relative to the first surface 312 is different to a slope of the fourth inclined surface 325b relative to the first surface 312.

The light guide plate 210 is disposed at a side of the beam splitting film 300. The light guide plate 210 has a third surface 212, a fourth surface 214 opposite to the third surface 212, and two light incident surfaces 216 (in FIG. 1A, light incident surfaces 216a and 216b are taken as an example) connecting the third surface 212 and the fourth surface 214. The two light incident surfaces 216a and 216b are respectively located at two opposite sides of the light guide plate 210, the third surface 212 is located between the second surface 314 and the fourth surface 214, and the second surface 314 is located between the first surface 312 and the third surface 212. The two light emitting elements 220a and 220b are respectively disposed beside the two light incident surfaces 216a and 216b, and are capable of respectively emitting two light beams 222a and 222b. In the present embodiment, the light emitting element 220 is, for example, a cold cathode fluorescent lamp (CCFL). However, in other embodiments, the light emitting element 220 may also be a light-emitting diode (LED) or other suitable light-emitting devices. The two light beams 222a and 222b respectively enter the light guide plate 210 through the two light incident surfaces 216a and 216b, and are transmitted to the beam splitting film 300 through the third surface 212.

In detail, after entering the light guide plate 210, the light beams 222a and 222b are continuously totally reflected between the third surface 212 and the fourth surface 214. However, a diffusion microstructure 218 on the surface (for example, the third surface 212 or the fourth surface 214, and in FIG. 1A, the fourth surface 214 is taken as an example) of the light guide plate 210 may destroy the total reflection, so that the light beams 222a and 222b may emit out from the light guide plate 210 through the third surface 212 to reach the beam splitting film 300, or the light beams 222a and 222b are transmitted to a reflection sheet 230 below the light guide plate 210, and are reflected by the reflection sheet 230 to further penetrate through the fourth surface 214 and the third surface 212 to reach the beam splitting film 300.

Moreover, the light emitting elements 220a and 220b are capable of alternately flickering. In other words, when the light emitting element 220a emits the light beam 222a, the light emitting element 220b does not emit the light beam 222b, and when the light emitting element 220b emits the light beam 222b, the light emitting element 220a does not emit the light beam 222a. In the present embodiment, a control unit 240 electrically connecting the two light emitting elements 220a and 220b may be used to drive the light emitting elements 220a and 220b to alternately flicker.

The LCD panel 110 is disposed at a side of the backlight module 200, wherein the first surface 312 is located between the LCD panel 110 and the second surface 314. In the present embodiment, the LCD panel 110 includes an active device array substrate 112, a liquid crystal layer 114, and an opposite substrate 116. The active device array substrate 112 is, for example, a thin film transistor (TFT) array substrate, and the opposite substrate 116 is, for example, a color filter array substrate. The liquid crystal layer 114 is disposed between the active device array substrate 112 and the opposite substrate 116.

In the present embodiment, each of the strip-shaped protrusion structures 320, and the first inclined surface group 322 and the second inclined surface group 324 of each of the strip-shaped protrusion structures 320 extend along a first direction D1, and the strip-shaped protrusion structures 320 are arranged along a second direction D2. In the present embodiment, the first direction D1 is substantially perpendicular to the second direction D2. Moreover, in the present embodiment, the strip-shaped protrusion structures 320 and the light transmissive substrate 310 are formed individually. However, in other embodiments, the strip-shaped protrusion structures 320 and the light transmissive substrate 310 may also be formed integrally.

In the present embodiment, the second inclined surface 323b connects the first inclined surface 323a and the fourth inclined surface 325b, and the fourth inclined surface 325b connects the second inclined surface 323b and the third inclined surface 325a. Moreover, in the present embodiment, an absolute value of the slope of the first inclined surface 323a is smaller than an absolute value of the slope of the second inclined surface 323b, and an absolute value of the slope of the third inclined surface 325a is smaller than an absolute value of the slope of the fourth inclined surface 325b. However, in other embodiments, the absolute value of the slope of the first inclined surface 323a may be greater than the absolute value of the slope of the second inclined surface 323b, and the absolute value of the slope of the third inclined surface 325a may be greater than the absolute value of the slope of the fourth inclined surface 325b.

Figure 1C:
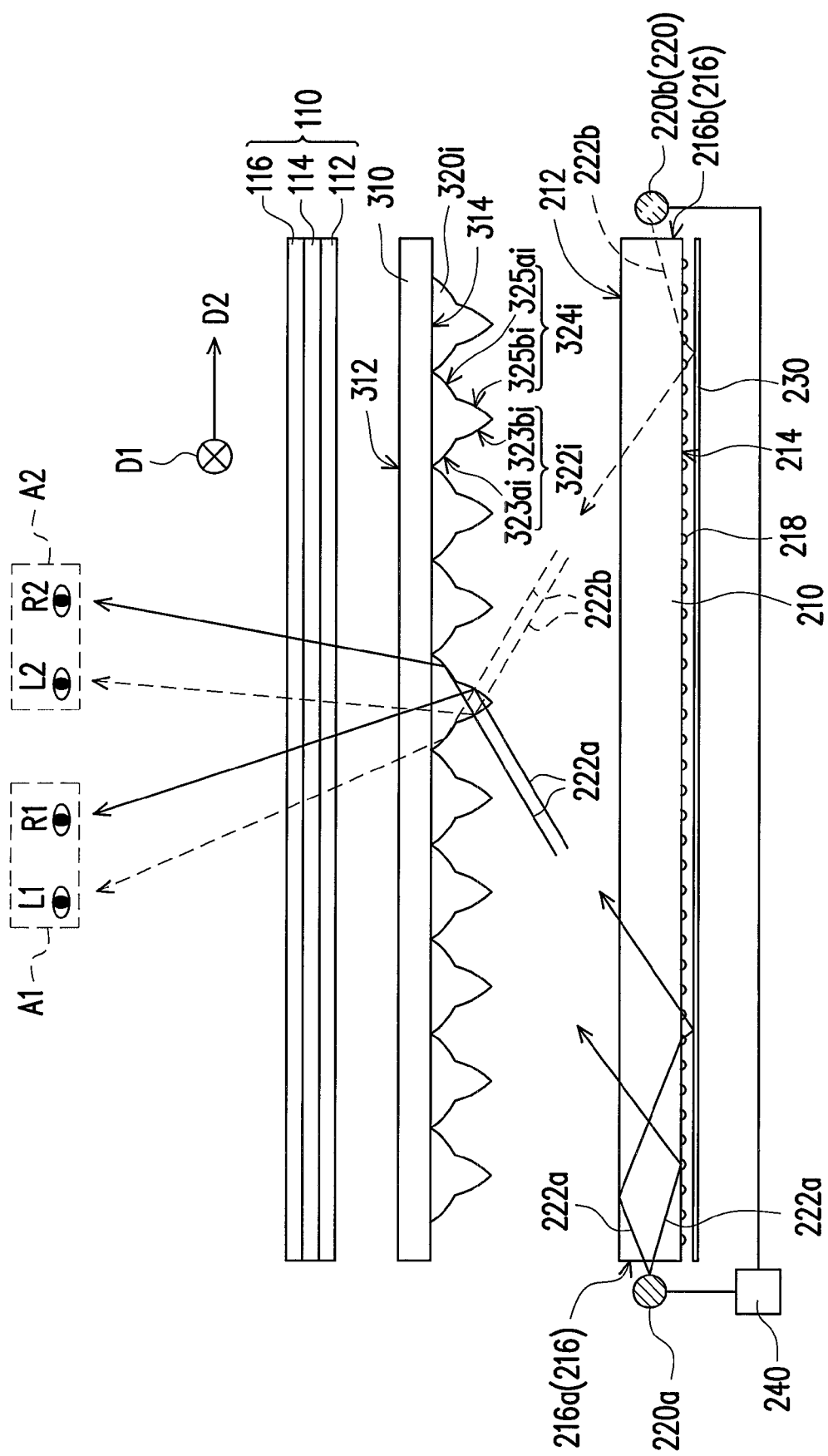
FIG. 1C is diagram illustrating a variation of a strip-shaped protrusion structure of FIG. 1A.

In the present embodiment, each of the first inclined surface 323a, the second inclined surface 323b, the third inclined surface 325a, and the fourth inclined surface 325b is a plane. However, in another embodiment, as shown in FIG. 1C, strip-shaped protrusion structures 320i may be used to replace the strip-shaped protrusion structures 320 of FIG. 1A, wherein a first inclined surface 323ai and a second inclined surface 323bi of a first inclined surface group 322i of the strip-shaped protrusion structure 320i may be curved surfaces, and a third inclined surface 325ai and a fourth inclined surface 325bi of a second inclined surface group 324i of the strip-shaped protrusion structure 320i may be curved surfaces. Moreover, a tangent slope at a place of the first inclined surface 323ai adjacent to the second inclined surface 323bi is different to a tangent slope at a place of the second inclined surface 323bi adjacent to the first inclined surface 323ai, and a tangent slope at a place of the third inclined surface 325ai adjacent to the fourth inclined surface 325bi is different to a tangent slope at a place of the fourth inclined surface 325bi adjacent to the third inclined surface 325ai. In other words, in the present embodiment, a junction of the first inclined surface 323ai and the second inclined surface 323bi is not smooth, and a junction of the third inclined surface 325ai and the fourth inclined surface 325bi is not smooth. In the present embodiment, the first inclined surface 323ai, the second inclined surface 323bi, the third inclined surface 325ai, and the fourth inclined surface 325bi are respectively a convex. However, in another embodiment, the first to the fourth inclined surfaces may be respectively a concave. In addition, in the other embodiments, a part of the first to the fourth inclined surfaces may be planes, and the other part of the first to the fourth inclined surfaces may be curved surfaces. It should be noticed that in the present embodiment, the slopes of the first inclined surface, the second inclined surface, the third inclined surface, and the fourth inclined surface (which are the curved surfaces) are respectively defined as an overall average slope, and the overall average slope of the first inclined surface is different to the overall average slope of the second inclined surface, and the overall average slope of the third inclined surface is different to the overall average slope of the fourth inclined surface.

Referring to FIG. 1A and FIG. 1B again, since in the each of the strip-shaped protrusion structures 320, the slope of the first inclined surface 323a of the first inclined surface group 322 is different to the slope of the second inclined surface 323b, and the slope of the third inclined surface 325a of the second inclined surface group 324 is different to the slope of the fourth inclined surface 325b, the second inclined surface group 324 may reflect the light beam 222a into two different directions, and the first inclined surface group 322 may reflect the light beam 222b into two different directions, so as to form two different vision zones A1 and A2.

In detail, a part of the light beam 222a from the light guide plate 210 sequentially penetrates through the first inclined surface group 322 and is totally reflected by the third inclined surface 325a, so that this part of the light beam 222a is transmitted top-rightwards to reach the LCD panel 110, and is further transmitted to a right eye R2 of a user located in the vision zone A2 after carrying an image provide by the LCD panel 110. On the other hand, another part of the light beam 222a from the light guide plate 210 sequentially penetrates through the first inclined surface group 322 and is totally reflected by the fourth inclined surface 325b, so that this part of the light beam 222a is transmitted top-leftwards to reach the LCD panel 110, and is further transmitted to a right eye R1 of a user located in the vision zone A1 after carrying an image provide by the LCD panel 110. Moreover, a part of the light beam 222b from the light guide plate 210 sequentially penetrates through the second inclined surface group 324 and is totally reflected by the first inclined surface 323a, so that this part of the light beam 222b is transmitted top-leftwards to reach the LCD panel 110, and is further transmitted to a left eye L1 of the user located in the vision zone A1 after carrying an image provide by the LCD panel 110. On the other hand, another part of the light beam 222b from the light guide plate 210 sequentially penetrates through the second inclined surface group 324 and is totally reflected by the second inclined surface 323b, so that this part of the light beam 222b is transmitted top-rightwards to reach the LCD panel 110, and is further transmitted to a left eye L2 of the user located in the vision zone A2 after carrying an image provide by the LCD panel 110.

In this way, after the light beam 222b transmitted to the left eye L1 and the light beam 222a transmitted to the right eye R1 are observed by the user located in the vision zone A1, a visual effect of stereo image may be formed in the brain of the user. On the other hand, after the light beam 222b transmitted to the left eye L2 and the light beam 222a transmitted to the right eye R2 are observed by the user located in the vision zone A2, the visual effect of stereo image may be formed in the brain of the user. Therefore, the stereo display apparatus 100 of the present embodiment may form two vision zones A1 and A2 to facilitate more users to simultaneously view and share the stereo images from different viewing angles. Moreover, since a plurality of vision zones may be formed to facilitate multiple users to simultaneously view the stereo images, a size of the stereo display apparatus 100 may be enlarged to facilitate utilization of more users.

Figure 2:
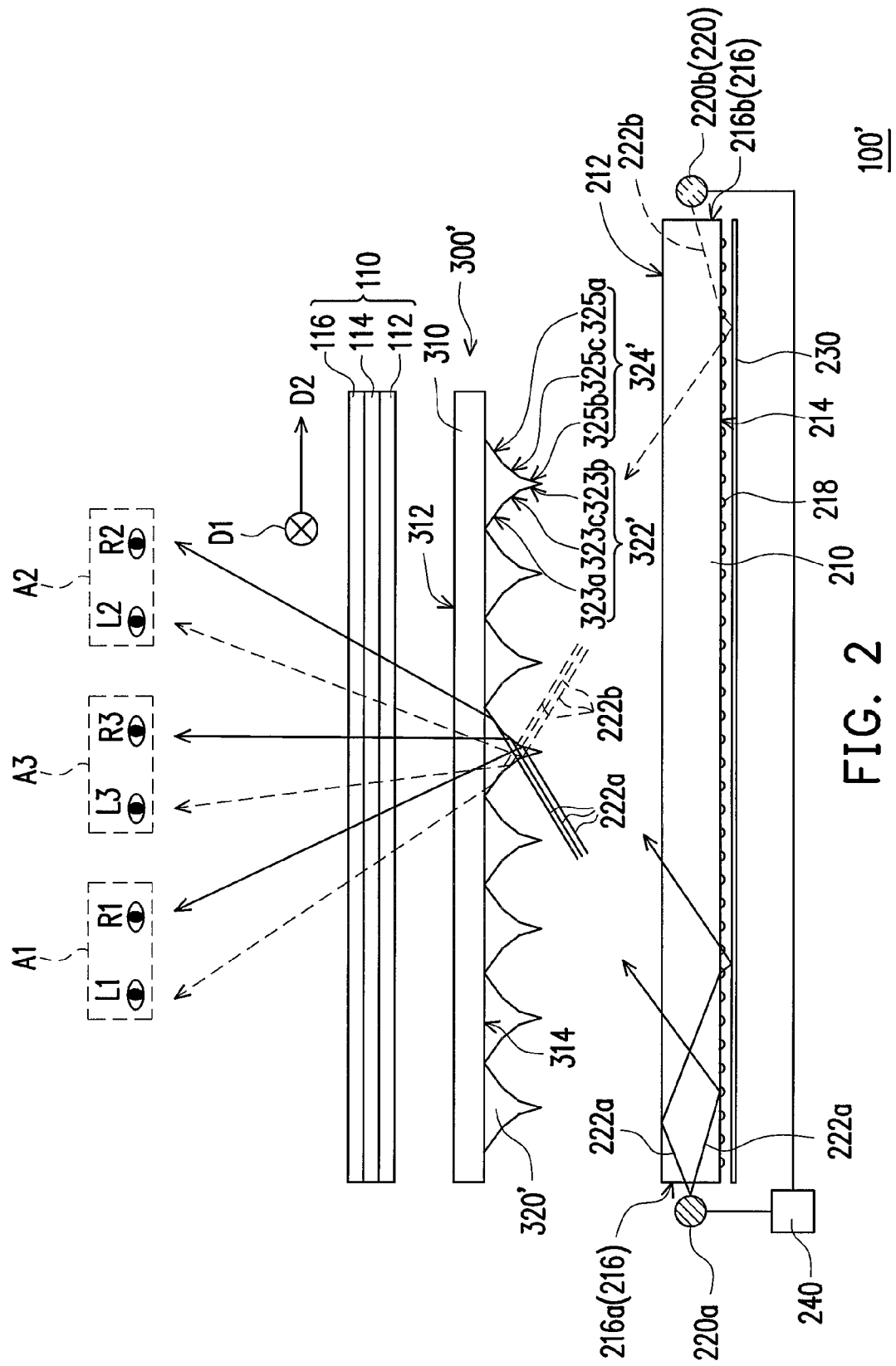
FIG. 2 is a cross-sectional view of a stereo display apparatus according to another embodiment of the invention.

Referring to FIG. 2, the stereo display apparatus 100' of the present embodiment is similar to the stereo display apparatus 100 of FIG. 1A, and differences therebetween are as follows. In the beam splitting film 300' of the present embodiment, the first inclined surface group 322' of the strip-shaped protrusion structure 320' further includes a fifth inclined surface 323c, and the second inclined surface group 324' further includes a sixth inclined surface 325c. A slope of the fifth inclined surface 323c relative to the first surface 312 is different to the slope of the first inclined surface 323a, and is different to the slope of the second inclined surface 323b. A slope of the sixth inclined surface 325c relative to the first surface 312 is different to the slope of the third inclined surface 325a, and is different to the slope of the fourth inclined surface 325b. Since each of the inclined surface groups has three inclined surfaces with different slopes, the light beam 222a may be reflected into three different directions, and the light beam 222b may also be reflected into three different directions, so that the stereo display apparatus 100' applying the beam splitting film 300' may form three different vision zones A1, A2 and A3 to facilitate more users to simultaneously view and share the stereo images. In detail, a part of the light beam 222a sequentially penetrates through the first inclined surface group 322' and is totally reflected by the sixth inclined surface 325c, so that this part of the light beam 222a is transmitted upwards to reach the LCD panel 110, and is further transmitted to a right eye R3 of a user located in the vision zone A3 after carrying an image provide by the LCD panel 110. A part of the light beam 222b sequentially penetrates through the second inclined surface group 324' and is totally reflected by the fifth inclined surface 323c, so that this part of the light beam 222b is transmitted upwards to reach the LCD panel 110, and is further transmitted to a left eye L3 of the user located in the vision zone A3 after carrying an image provide by the LCD panel 110. Deduced according to the embodiment of FIG. 1 and the present embodiment, in other embodiments, each of the inclined surface group may include N inclined surfaces with different slopes, so as to generate N vision zones, wherein N is an integer greater than 3. When a number of the vision zones is suitably increased, the number of users capable of simultaneously viewing and sharing the stereo images is accordingly increased.

Figure 3:
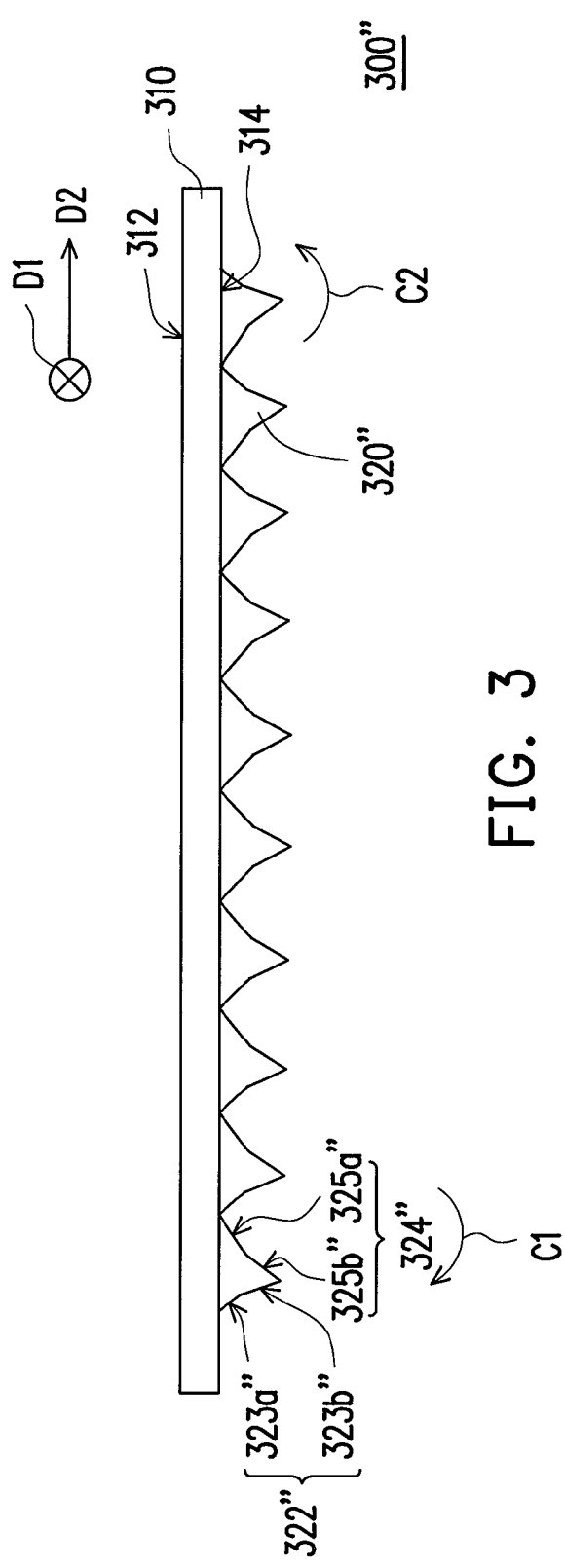
FIG. 3 is a cross-sectional view of a beam splitting film in a stereo display apparatus according to another embodiment of the invention.

Referring to FIG. 3, the beam splitting film 300" of the present embodiment is similar to the beam splitting film 300 of FIG. 1A, and differences therebetween are as follows. Since the viewing angles for the human eyes viewing a left part and a right part of the stereo display apparatus are different, when the stereo display apparatus has a large size, the viewing angle difference for viewing the left part and the right part of the stereo display apparatus may be greater. In this case, to improve a display correctness of the stereo image, pointing directions of one ends of the first inclined surface groups 322" of the strip-shaped protrusion structures 320" located away from the light transmissive substrate 310 and pointing directions of one ends of the second inclined surface groups 324" located away from the light transmissive substrate 310 are gradually rotated away from a center of the light transmissive substrate 310 as locations of the strip-shaped protrusion structures 320" gradually depart from the center of the light transmissive substrate 310. In other words, the further the first inclined surface 323a", the second inclined surface 323b", the third inclined surface 325a", and the fourth inclined surface 325b" of the strip-shaped protrusion structure 320" are closed to the left part of the figure and away from the center of the light transmissive substrate 310, the more the first inclined surface 323a", the second inclined surface 323b", the third inclined surface 325a", and the fourth inclined surface 325b" of the strip-shaped protrusion structure 320" are rotated along a clockwise direction C1, i.e. the greater the absolute values of the first inclined surface 323a" and the second inclined surface 323b" are, and the smaller the absolute values of the third inclined surface 325a" and the fourth inclined surface 325b" are. On the other hand, the further the first inclined surface 323a", the second inclined surface 323b", the third inclined surface 325a", and the fourth inclined surface 325b" of the strip-shaped protrusion structure 320" are closed to the right part of the figure and away from the center of the light transmissive substrate 310, the more the first inclined surface 323a", the second inclined surface 323b", the third inclined surface 325a", and the fourth inclined surface 325b" of the strip-shaped protrusion structure 320" are rotated along an anticlockwise direction C2, i.e. the smaller the absolute values of the first inclined surface 323a" and the second inclined surface 323b" are, and the greater the absolute values of the third inclined surface 325a" and the fourth inclined surface 325b" are.

In this way, the light beam passing through the left part of the beam splitting film 300" is slightly deflected rightwards, and the light beam passing through the right part of the beam splitting film 300" is slightly deflected leftwards, so as to improve the display correctness of the stereo image. A rotation degree of the first inclined surface 323a", the second inclined surface 323b", the third inclined surface 325a", and the fourth inclined surface 325b" may be adjusted according to the size of the stereo display apparatus, a suitable viewing distance of the users and the other parameters.

Figure 4:
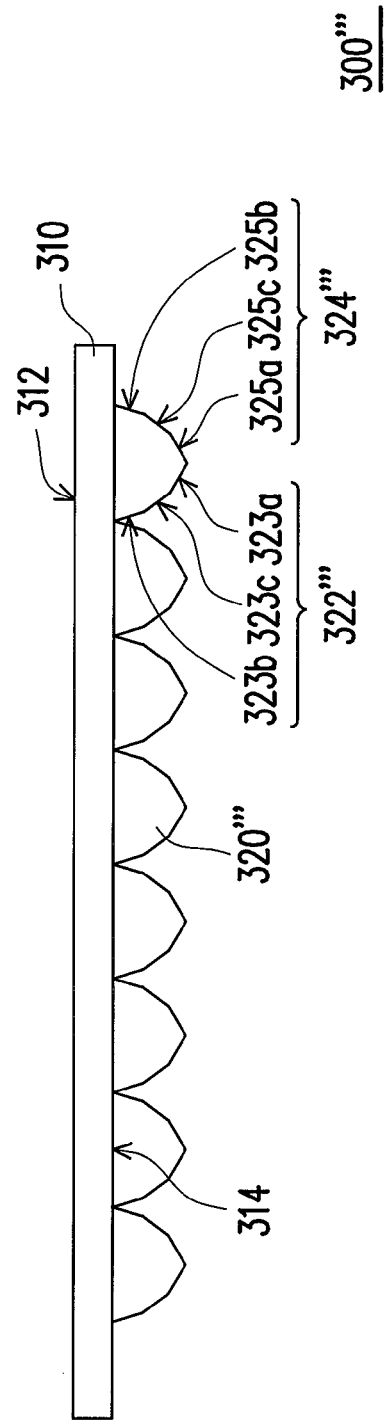
FIG. 4 is a cross-sectional view of a beam splitting film in a stereo display apparatus according to still another embodiment of the invention.

Referring to FIG. 4, the beam splitting film 300'" of the present embodiment is similar to the beam splitting film 300' of FIG. 2, and a difference therebetween is that an arranging sequence of the first inclined surface 323a, the second inclined surface 323b, the third inclined surface 325a, the fourth inclined surface 325b, the fifth inclined surface 323c, and the sixth inclined surface 325c is different. In the strip-shaped protrusion structure 320'" of the beam splitting film 300'" of the present embodiment, the second inclined surface 323b, the fifth inclined surface 323c, the first inclined surface 323a, the third inclined surface 325a, the sixth inclined surface 325c, and the fourth inclined surface 325b are sequentially arranged from the left to the right of the figure. In other words, absolute values of the slopes of the inclined surfaces in the first inclined surface group 322''' are decreased from the left to the right, and absolute values of the slopes of the inclined surfaces in the second inclined surface group 324''' are increased from the left to the right. However, in other embodiments, the strip-shaped protrusion structure may also be an asymmetric structure, for example, the absolute values of the slopes of the inclined surfaces in the first inclined surface group are decreased from the left to the right, and the absolute values of the slopes of the inclined surfaces in the second inclined surface group are also decreased from the left to the right. Moreover, in other embodiments, the arranging sequence of the inclined surfaces of different slopes in each of the inclined surface groups may be various possible sequences, so as to form different strip-shaped protrusion structures, and the arranging sequence is determined according to an actual design requirement.

In summary, the embodiments of the invention may have at least one of the following advantages or effects. In the beam splitting film, the backlight module and the stereo display apparatus according to embodiments of the invention, since in each of the strip-shaped protrusion structures, the slope of the first inclined surface of the first inclined surface group is different to the slope of the second inclined surface, and the slope of the third inclined surface of the second inclined surface group is different to the slope of the fourth inclined surface, the light beam may be reflected into different directions, so as to form a plurality of vision zones. In this way, multiple users may simultaneously view and share stereo images from different viewing angles.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
   a beam splitting film, comprising:
      a light transmissive substrate, having a first surface and a second surface opposite to the first surface, wherein the first surface is a light emitting surface; and
      a plurality of strip-shaped protrusion structures, disposed on the second surface, wherein each of the strip-shaped protrusion structures has a first inclined surface group and a second inclined surface group, the first inclined surface group and the second inclined surface group are inclined to the first surface, an inclining direction of the first inclined surface group relative to the first surface is opposite to an inclining direction of the second inclined surface group relative to the first surface, the first inclined surface group comprises a first inclined surface and a second inclined surface, a slope of the first inclined surface relative to the first surface is different to a slope of the second inclined surface relative to the first surface, the second inclined surface group comprises a third inclined surface and a fourth inclined surface, and a slope of the third inclined surface relative to the first surface is different to a slope of the fourth inclined surface relative to the first surface;
   a light guide plate, disposed at a side of the beam splitting film, wherein the light guide plate has a third surface, a fourth surface opposite to the third surface, and two light incident surfaces connecting the third surface and the fourth surface, the two light incident surfaces are respectively located at two opposite sides of the light guide plate, the third surface is located between the second surface and the fourth surface, and the second surface is located between the first surface and the third surface; and
   two light emitting elements, respectively disposed beside the two light incident surfaces, and capable of respectively emitting two light beams, wherein the two light beams are capable of respectively entering the light guide plate through the two light incident surfaces and being transmitted to the beam splitting film through the third surface, and the two light emitting elements are capable of alternately flickering.

2. The backlight module as claimed in claim 1, wherein each of the strip-shaped protrusion structures and the first inclined surface group and the second inclined surface group of each of the strip-shaped protrusion structures extend along a first direction, and the strip-shaped protrusion structures are arranged along a second direction.

3. The backlight module as claimed in claim 2, wherein the first direction is substantially perpendicular to the second direction.

4. The backlight module as claimed in claim 1, wherein the second inclined surface connects the first inclined surface and the fourth inclined surface, the fourth inclined surface connects the second inclined surface and the third inclined surface, an absolute value of the slope of the first inclined surface is smaller than an absolute value of the slope of the second inclined surface, and an absolute value of the slope of the third inclined surface is smaller than an absolute value of the slope of the fourth inclined surface.

5. The backlight module as claimed in claim 1, wherein the second inclined surface connects the first inclined surface and the fourth inclined surface, the fourth inclined surface connects the second inclined surface and the third inclined surface, an absolute value of the slope of the first inclined surface is greater than an absolute value of the slope of the second inclined surface, and an absolute value of the slope of the third inclined surface is greater than an absolute value of the slope of the fourth inclined surface.

6. The backlight module as claimed in claim 1, wherein the first inclined surface group further comprises a fifth inclined surface, the second inclined surface group further comprises a sixth inclined surface, a slope of the fifth inclined surface relative to the first surface is different to the slope of the first inclined surface and is different to the slope of the second inclined surface, and a slope of the sixth inclined surface relative to the first surface is different to the slope of the third inclined surface and is different to the slope of the fourth inclined surface.

7. The backlight module as claimed in claim 1, wherein each of the first inclined surface, the second inclined surface, the third inclined surface, and the fourth inclined surface is a plane.

8. The backlight module as claimed in claim 1, wherein each of the first inclined surface, the second inclined surface, the third inclined surface, and the fourth inclined surface is a curved surface.

9. The backlight module as claimed in claim 8, wherein a tangent slope at a place of the first inclined surface adjacent to the second inclined surface is different to a tangent slope at a place of the second inclined surface adjacent to the first inclined surface, and a tangent slope at a place of the third inclined surface adjacent to the fourth inclined surface is different to a tangent slope at a place of the fourth inclined surface adjacent to the third inclined surface.

10. The backlight module as claimed in claim 1, wherein pointing directions of one ends of the first inclined surface groups of the strip-shaped protrusion structures located away from the light transmissive substrate and pointing directions of one ends of the second inclined surface groups located away from the light transmissive substrate are gradually rotated away from a center of the light transmissive substrate as locations of the strip-shaped protrusion structures gradually depart from the center of the light transmissive substrate.

11. A stereo display apparatus, comprising:
a backlight module, comprising:
a beam splitting film, comprising:
a light transmissive substrate, having a first surface and a second surface opposite to the first surface, wherein the first surface is a light emitting surface; and
a plurality of strip-shaped protrusion structures, disposed on the second surface, wherein each of the strip-shaped protrusion structures has a first inclined surface group and a second inclined surface group, the first inclined surface group and the second inclined surface group are inclined to the first surface, an inclining direction of the first inclined surface group relative to the first surface is opposite to an inclining direction of the second inclined surface group relative to the first surface, the first inclined surface group comprises a first inclined surface and a second inclined surface, a slope of the first inclined surface relative to the first surface is different to a slope of the second inclined surface relative to the first surface, the second inclined surface group comprises a third inclined surface and a fourth inclined surface, and a slope of the third inclined surface relative to the first surface is different to a slope of the fourth inclined surface relative to the first surface;

a light guide plate, disposed at a side of the beam splitting film, wherein the light guide plate has a third surface, a fourth surface opposite to the third surface, and two light incident surfaces connecting the third surface and the fourth surface, the two light incident surfaces are respectively located at two opposite sides of the light guide plate, the third surface is located between the second surface and the fourth surface, and the second surface is located between the first surface and the third surface;
two light emitting elements, respectively disposed beside the two light incident surfaces and capable of respectively emitting two light beams, wherein the two light beams are capable of respectively entering the light guide plate through the two light incident surfaces and being transmitted to the beam splitting film through the third surface, and the two light emitting elements are capable of alternately flickering; and
a liquid crystal display (LCD) panel, disposed at a side of the backlight module, wherein the first surface is located between the LCD panel and the second surface.

12. The stereo display apparatus as claimed in claim 11, wherein each of the strip-shaped protrusion structures and the first inclined surface group and the second inclined surface group of each of the strip-shaped protrusion structures extend along a first direction, and the strip-shaped protrusion structures are arranged along a second direction.

13. The stereo display apparatus as claimed in claim 12, wherein the first direction is substantially perpendicular to the second direction.

14. The stereo display apparatus as claimed in claim 11, wherein the second inclined surface connects the first inclined surface and the fourth inclined surface, the fourth inclined surface connects the second inclined surface and the third inclined surface, an absolute value of the slope of the first inclined surface is smaller than an absolute value of the slope of the second inclined surface, and an absolute value of the slope of the third inclined surface is smaller than an absolute value of the slope of the fourth inclined surface.

15. The stereo display apparatus as claimed in claim 11, wherein the second inclined surface connects the first inclined surface and the fourth inclined surface, the fourth inclined surface connects the second inclined surface and the third inclined surface, an absolute value of the slope of the first inclined surface is greater than an absolute value of the slope of the second inclined surface, and an absolute value of the slope of the third inclined surface is greater than an absolute value of the slope of the fourth inclined surface.

16. The stereo display apparatus as claimed in claim 11, wherein the first inclined surface group further comprises a fifth inclined surface, the second inclined surface group further includes a sixth inclined surface, a slope of the fifth inclined surface relative to the first surface is different to the slope of the first inclined surface and is different to the slope of the second inclined surface, and a slope of the sixth inclined surface relative to the first surface is different to the slope of the third inclined surface and is different to the slope of the fourth inclined surface.

17. The stereo display apparatus as claimed in claim 11, wherein each of the first inclined surface, the second inclined surface, the third inclined surface, and the fourth inclined surface is a plane.

18. The stereo display apparatus as claimed in claim 11, wherein each of the first inclined surface, the second inclined surface, the third inclined surface, and the fourth inclined surface is a curved surface.

19. The stereo display apparatus as claimed in claim 18, wherein a tangent slope at a place of the first inclined surface adjacent to the second inclined surface is different to a tangent slope at a place of the second inclined surface adjacent to the first inclined surface, and a tangent slope at a place of the third inclined surface adjacent to the fourth inclined surface is different to a tangent slope at a place of the fourth inclined surface adjacent to the third inclined surface.

20. The stereo display apparatus as claimed in claim 11, wherein pointing directions of one ends of the first inclined surface groups of the strip-shaped protrusion structures located away from the light transmissive substrate and pointing directions of one ends of the second inclined surface groups located away from the light transmissive substrate are gradually rotated away from a center of the light transmissive substrate as locations of the strip-shaped protrusion structures gradually depart from the center of the light transmissive substrate.

* * * * *